US009719026B2

(12) United States Patent
Bories et al.

(10) Patent No.: US 9,719,026 B2
(45) Date of Patent: Aug. 1, 2017

(54) CATALYTIC CRACKING PROCESS FOR THE TREATMENT OF A FRACTION HAVING A LOW CONRADSON CARBON RESIDUE

(71) Applicant: TOTAL RAFFINAGE MARKETING, Puteaux (FR)

(72) Inventors: Marc Bories, Saint Jouin de Bruneval (FR); Patrick Leroy, Saint Vigor d'Ymonville (FR)

(73) Assignee: TOTAL RAFFINAGE FRANCE, Courbevoie (FR)

( * ) Notice: Subject to any disclaimer, the term of this patent is extended or adjusted under 35 U.S.C. 154(b) by 0 days.

(21) Appl. No.: 14/971,322

(22) Filed: Dec. 16, 2015

(65) Prior Publication Data

US 2016/0101397 A1    Apr. 14, 2016

Related U.S. Application Data

(62) Division of application No. 13/879,717, filed as application No. PCT/FR2011/052912 on Dec. 9, 2011.

(30) Foreign Application Priority Data

Dec. 27, 2010    (FR) .................................. 10 61287

(51) Int. Cl.
*C10G 11/20* (2006.01)
*B01J 8/26* (2006.01)
(Continued)

(52) U.S. Cl.
CPC ............. *C10G 11/20* (2013.01); *B01J 8/0045* (2013.01); *B01J 8/1827* (2013.01); *B01J 8/24* (2013.01);
(Continued)

(58) Field of Classification Search
CPC ......... B01J 8/34; B01J 8/30; B01J 8/26; B01J 8/24; B01J 8/1827; C10G 11/182; C10G 11/187

See application file for complete search history.

(56) References Cited

U.S. PATENT DOCUMENTS

| 5,716,585 | A | 2/1998 | Senegas et al. |
| 7,767,075 | B2 * | 8/2010 | Hedrick ................. C10G 11/18 208/106 |
| 2009/0159497 | A1 | 6/2009 | Hedrick |

FOREIGN PATENT DOCUMENTS

| EP | 0 850 687 A2 | 7/1998 |
| EP | 2 072 605 A1 | 6/2009 |
| FR | 2 728 805 A1 | 7/1996 |

OTHER PUBLICATIONS

International Search Report of PCT/FR2011/052912 dated Apr. 19, 2012.

* cited by examiner

*Primary Examiner* — Lessanework Seifu
(74) *Attorney, Agent, or Firm* — Sughrue Mion, PLLC

(57) ABSTRACT

Process for the fluidized-bed catalytic cracking of a weakly coking feedstock having a Conradson carbon residue equal to or less than 0.1% by weight and a hydrogen content equal to or greater than 12.7% by weight, comprising at least a step of cracking the feedstock, a step of separating/stripping the effluents from the coked catalyst particles and a step of regenerating said particles, the process being characterized in that at least one coking, carbonaceous and/or hydrocarbonaceous effluent having a content of aromatic compounds of greater than 50% by weight, comprising more than 20% by weight of polyaromatic compounds, is recycled to homogeneously distributed and weakly coked catalyst, before regeneration, in order to adjust the delta coke of the process.

7 Claims, 3 Drawing Sheets

(51) Int. Cl.
  *B01J 8/34*   (2006.01)
  *B01J 8/00*   (2006.01)
  *B01J 8/18*   (2006.01)
  *B01J 8/30*   (2006.01)
  *C10G 11/18*  (2006.01)
  *B01J 8/24*   (2006.01)

(52) U.S. Cl.
  CPC . *B01J 8/26* (2013.01); *B01J 8/30* (2013.01); *B01J 8/34* (2013.01); *C10G 11/182* (2013.01); *C10G 11/187* (2013.01); *B01J 2208/00017* (2013.01); *B01J 2208/00557* (2013.01); *B01J 2208/00991* (2013.01); *C10G 2300/1014* (2013.01); *C10G 2300/1022* (2013.01); *C10G 2300/1077* (2013.01); *C10G 2300/1096* (2013.01); *C10G 2300/206* (2013.01); *C10G 2300/301* (2013.01); *C10G 2300/4081* (2013.01); *C10G 2300/4093* (2013.01); *C10G 2300/708* (2013.01); *Y02P 30/20* (2015.11); *Y02P 30/446* (2015.11)

CATALYTIC CRACKING PROCESS FOR THE TREATMENT OF A FRACTION HAVING A LOW CONRADSON CARBON RESIDUE

This application is a divisional of U.S. application Ser. No. 13/879,717, filed Jul. 22, 2013, which is a national stage of PCT Application No. PCT/FR2011/052912, filed Dec. 9, 2011, claiming priority based on French Patent Application No. 10 61287 filed Dec. 27, 2010, the entire disclosures of which are incorporated by reference in their entirety.

FIELD OF THE INVENTION

The field of the present invention is that of the catalytic cracking of petroleum fractions, more particularly fractions which have a low Conradson carbon residue and a high hydrogen content and which, consequently, make it difficult to obtain the heat balance of the unit.

In a FCC (fluid catalytic cracking) unit, the heat balance is provided by the combustion of coke deposited on the catalyst during the reaction step. This combustion takes place in the regeneration zone. Typically, the catalyst enters the regeneration zone with a coke content (defined as the ratio of the mass of coke to the mass of catalyst expressed as a percentage by weight) of between 0.5 and 1% by weight and leaves said zone with a coke content of between 0.1 and 0.5% by weight for regenerators operating in partial combustion mode or between 0.1 and 0.05% by weight, or even less than 0.01% by weight, for regenerators operating in complete combustion mode.

In complete-combustion regeneration, all of the coke is burnt (typical CO (carbon monoxide) content in the flue gas close to zero) whereas in partial combustion mode the combustion of the coke produces CO with a content of a few percent by volume, typically 0.5 to 10% by volume, depending on the air throughput and the degree of completeness of the combustion in the case of incomplete combustion.

The Conradson carbon residue (or CCR) of the feedstock is defined by the ASTM D 482 standard and represents, for those skilled in the art, a measure of the amount of coke that the feedstock may produce during the catalytic cracking reaction that takes place in the main reactor of the unit. Depending on the Conradson carbon residue of the feedstock, it is possible to size the unit for a coke yield corresponding to the cracking of the feedstock so as to meet the heat balance of the unit that will control the correct operation thereof.

Conventional heavy fractions treated in an FCC unit generally have Conradson carbon residues lying in the range from 0.2 to 10% by weight.

The fractions treated in an FCC unit according to the present invention may have a Conradson carbon residue equal to or less than 0.1% by weight and a hydrogen content equal to or greater than 12.7% by weight.

EXAMINATION OF THE PRIOR ART

To equilibrate the heat balance, those skilled in the art know to push the combustion in the regenerator by injecting thereinto more air for a given amount of coke, i.e. to reduce the volume percentage of carbon monoxide (CO) in the flue gas, which contributes to increase the temperature of the catalyst within said regenerator and necessarily helps to meet the heat balance of the unit. However, it is not necessary to increase the injected air quantity more than the quantity necessary to the combustion of the coke present on the coked catalyst of the dense bed in the regenerator. The combustion of coke allows an increase of the temperature of the regenerated catalyst up to the desired cracking temperature of the feed, and thus an equilibrium of the heat balance of the unit.

When this increase of the injected air volume is not sufficient or possible, it is known in the prior art to recycle into the regenerator a fraction resulting from the FCC having a high coke potential, known as a coking fraction, said fraction being introduced directly within the regenerator. This coking fraction is generally a fraction resulting from the cracking of the feedstock which is generally the "slurry" fraction, i.e. a predominantly aromatic 360° C.+ fraction, or any hydrocarbon fraction such as fuel oil No. 2 or domestic fuel oil. This recycling of a coking fraction to the regenerator, common practice in the start-up phases of the unit, is tricky and is a source of problems during continuous use. This is because, since the temperatures in the regenerator are around 650° C. to 750° C., a portion of the recycle vaporizes, forming cracked gases that will be found in the dilute phase of the regenerator where they thus run the risk of creating hot spots that may be damaging to the proper operation of the regenerator. This phenomenon, often called "afterburning" or "post-combustion", may be defined as further combustion at an undesired point in the regenerator, for example in the dilute phase where the solid catalyst is present in a smaller amount, or at the inlet of or inside one of the cyclones also present in the enclosure of the regenerator, or else in the combustion gas discharge lines. This term "afterburning", well accepted and practiced by those skilled in the art, will be used in the rest of the text.

Moreover, this recycle stream runs the risk of burning in the catalyst bed, locally forming a high-temperature flame front. This flame front generates hot spots with locally high temperatures within the catalyst bed. Since steam also forms when these hydrocarbons are burnt, these local high temperatures combined with the presence of steam weaken the active part of the catalyst (zeolite) and thus deactivate its cracking function. It is referred to as hydrothermal catalyst deactivation. It is observed that the richer this recycled fraction is in hydrogen (the lighter the fraction is, the higher its hydrogen content is, generating more steam by combustion), the greater the generation of steam is that results from its combustion.

It is also known to recycle hydrocarbons of tar or coke type to the stripper either in order to optimize the production of petrol and olefins via the use of bifunctional catalysts with recycle of hydrocarbons (U.S. Pat. No. 3,856,659) or else to use the exothermicity of the recycle in order to improve the stripping of the coked catalyst particles in the stripper (U.S. Pat. No. 4,888,103). The optimization of the coking reaction on the initially coked catalyst by the feedstock, with a view to treating weakly coking feedstocks which do not make it possible to obtain the thermal equilibrium necessary for the proper operation of the catalytic cracking process, is not mentioned in any of these documents.

In patent EP 2072605, the regenerator is used as a synthesis gas generator: for this purpose, a quantity of coking fraction on the catalyst coked by the feedstock is recycled to the stripper. However, this quantity is much greater than that needed for the normal functioning of a regenerator in combustion making it possible to maintain the temperature of the exiting regenerated catalyst between 690 and 750° C., which temperature makes it possible to ensure the thermal equilibrium of the catalytic cracking unit. In order to consume the excess coke formed by the recycle and in order to limit $CO_2$ production, not only is oxygen from the air injected into the regenerator but also steam in order to form the synthesis gas by consuming the coke. Since the gasification reaction is highly endothermic, there is no increase of the temperature beyond the critical threshold. In this document, the FCC process is considered to be a means of eliminating the $CO_2$ released at the regenerator.

The present invention therefore targets the catalytic cracking of a weakly coking fraction comprising the recycling of at least one coking fraction that makes it possible to increase the amount of coke in the catalyst before its entry into the regenerator operating in combustion mode, but that also makes it possible to avoid the formation of hot spots in the dilute phase of the fluidized bed (afterburning) and to deactivate the catalyst (hot spots in the dense phase within the regenerator or stripper), the recycle taking place in a zone for the homogeneous distribution of the coked catalyst particles.

Another objective of the present invention is to prevent the phenomenon of "afterburning" and of steam described previously which takes place in the regenerator by limiting the amount of hydrogen-rich light hydrocarbons that might have been entrained in the coke.

BRIEF DESCRIPTION OF THE INVENTION

The present invention applies both to FCC units using a reactor operating in upflow mode (called a "riser" reactor) and to units using a reactor operating in downflow mode (called a "downer" reactor), but always to units in which the regenerator operates in the combustion mode.

The present invention also applies to FCC units operating with a single reactor (in upflow mode or downflow mode) and to FCC units operating with two or more reactors. In general, when the FCC units operate with two reactors—a main reactor and a secondary reactor—if they operate in maximum petrol or in maximum LCO mode, these reactors are riser reactors, but a unit operating with two downer reactors or with one riser reactor and one downer reactor would not be outside the scope of the present invention.

The feedstocks that an FCC unit according to the present invention can treat are feedstocks having a Conradson carbon residue equal to or less than 0.1% by weight and a hydrogen content equal to or greater than 12.7% by weight.

The present invention can be described as a process for the catalytic cracking of a weakly coking feedstock having a Conradson carbon residue equal to or less than 0.1% by weight and a hydrogen content equal to or greater than 12.7% by weight, comprising at least a feedstock cracking step, a step for separating/stripping the effluents from the coked catalyst particles, a step for regenerating said particles by partial or complete combustion of the coke, and the recycle of at least a coking, hydrocarbonaceous effluent to catalyst that is homogeneously distributed and weakly coked by said feedstock, before regeneration, the characteristic of the process being that the amount of coking effluent injected into the coked catalyst is adjusted so as to deliver an additional amount of coke $Q_r$ to the catalyst so as to satisfy the following equation (I):

$$Q_t = Q_i + Q_r \qquad (I),$$

in which $Q_i$ is the initial coke content of the coked catalyst after the feedstock has been cracked and $Q_t$ or delta coke is the coke content burned by partial or complete combustion, necessary for maintaining the heat balance of the process and for maintaining the temperature of the regenerated catalyst at a temperature equal to or more than 690° C., preferably varying from 690° C. to 750° C., said coking effluent having a content of aromatic compounds equal to or greater than 50% by weight, comprising 20% by weight or more or polyaromatic compounds, also referred to subsequently in the present description as "coking fraction".

The expression "polyaromatic compound" is understood to mean a compound comprising at least two aromatic rings with two common vicinal carbon atoms. A weakly coked catalyst is a catalyst for which the amount of coke obtained by cracking a feedstock is not large enough to maintain the heat balance of the catalytic cracking unit in which it is used. Specifically, the regeneration of the catalyst, by burning off the coke, releases heat that should be recovered in sufficient amount by the catalyst so that the latter supplies, on the one hand, energy sufficient to vaporize almost completely the feedstock injected in liquid form into the reactor and supplies, on the other hand, sufficient energy to the generally endothermic cracking reactions so as to maintain a reaction temperature at the outlet of said reactor which is generally between 480 and 650° C. depending on the desired conversion objectives and configurations.

The advantage of the present invention is essentially that the amount of coke that is deposited homogeneously on the catalyst particles before they enter the regenerator of the unit is increased. This increase in the coke (or delta coke) to be burnt off in the regenerator has the effect of increasing the heat resulting from the combustion of the coke and consequently of homogeneously increasing the temperature of the resulting regenerated catalyst particles that will be recycled into the main reactor without creating hot spots that are damaging to the catalytic activity. The final advantage is that when the feedstocks introduced into the main reactor do not form enough coke for the cracking, the recycle of coking hydrocarbonaceous effluent makes it possible for the amount of coke or delta coke needed for thermal equilibrium of the unit to be adjusted, that is the recycle of coking hydrocarbonaceous effluent makes it possible for the temperature of the regenerated catalyst leaving the regenerator to be adjusted, and thus to ensure that said unit operates efficiently, even when weakly coking feedstocks are cracked.

For efficient operation of the FCC unit fed with a weakly coking feedstock, the amount of coke ($Q_t$) present on the catalyst entering the regenerator, necessary for equilibrating the heat balance, will have to correspond to the sum of the initial amount of coke ($Q_i$) supplied by the cracking of the feedstock over the catalyst (in the main reactor(s)) and of the additional amount of coke ($Q_r$) supplied by recycling the effluent to the coked catalyst after the feedstock has been cracked.

Generally, $Q_t$, the amount of coke trapped on the catalyst, or "delta coke", entering into the regenerator, typical for a balanced heat balance may be allowed to vary between 0.5 and 1.4% by weight (limits included). For attaining thermal equilibrium, that is a temperature of the regenerated catalyst which will be in contact with the feedstock, is equal to or more than 690° C. (varying for example from 690° C. to 750° C.), the injected air quantity will have to be adjusted according to the amount of coked which has been formed.

Preferably, $Q_t$ is kept between 0.5 and 1.1% by weight (limits included) when the combustion takes place in a single-stage regenerator with complete combustion, and between 0.8 and 1.4% by weight (limits included) for a partial combustion in a first stage of a multistage regenerator comprising at least two regeneration stages.

To implement the invention, the hydrocarbonaceous effluent having an aromatic content equal to or greater than 50% by weight, comprising 20% by weight or more or polyaromatic compounds, also called coking fraction subsequently in the present description, is a predominantly aromatic, carbonaceous and/or hydrocarbonaceous effluent, the boiling point of which is equal to or greater than 220° C., and preferably equal to or greater than 340° C., such as LCO (light cycle oil) or HCO (heavy cycle oil) fractions with a distillation range typically between 360 and 440° C., and "slurry" (residual sludge from catalytic cracking) with a distillation range equal to or greater than 360° C. or 360° C.+, the fractions of finished products of heavy fuel oil type, such as Fuel oil No. 2, intermediate fractions resulting from atmospheric distillation or vacuum distillation such as distillation residues, or else highly aromatic fractions resulting from the conversion of crude oil, biomass resulting from the conversion of wood and/or cellulose, petroleum coke or biomass that is powdered, dispersed in or sprayed into a fluid by dilution or blowing, asphalt-rich fractions coming from deasphalting units, waxes resulting from the liquefaction of coal by an indirect (GTL) process or from a Fischer-Tropsch process for converting gas into hydrocarbons, petroleum coke, or a mixture of said fractions.

Among the weakly coking feedstocks that the present invention can treat may be found the following:
  purges from a hydrocracker unit, called bleeds, having a hydrogen content equal to or greater than 12.7% by weight as they are highly paraffinic;
  severely pretreated VGO (vacuum gas oil) feedstocks (resulting from the vacuum distillation of atmospheric distillation residues), having a boiling point equal to or greater than 350° C. and having hydrogen contents equal to or greater than 12.7% by weight;
  vegetable oils; and
  paraffins resulting from the Fischer-Tropsch process;
  it being possible for these feedstocks to be cracked individually or as a mixture in the main and/or secondary reactor of the catalytic cracking unit.

The present invention involves the production of effluents such as, for example, petrol from a feedstock having a Conradson carbon residue equal to or less than 0.1% by weight and a hydrogen content equal to or greater than 12.7% by weight, by fluid catalytic cracking (FCC), the corresponding unit having at least one main reactor operating in upflow mode (riser reactor) or in downflow mode (downer reactor), the coked catalyst leaving the reactor being introduced into a separating/stripping zone in which the coked catalyst is separated from the cracking effluents, then recovered in the stripping step, in the stripper of the unit. Said stripping step operating in a fluidized bed and having a dense phase surmounted by a dilute phase, the recycle of hydrocarbonaceous effluents, or coking fraction, is carried out in at least one zone, referred to as a recycle zone, by means of at least one dispersion device within the dense phase of the stripper. However, in order for this diffusion to be optimal and for there to be no hot spots with risks of over-coking which may give rise to hot spots later during the combustion in the regenerator, the dense catalyst phase corresponding to the coking effluent recycle zone is homogenized by inserting at least one structured packing element that improves the dispersion of the coked catalyst particles located upstream of the dispersing of the recycle relative to the stream of catalyst particles and that prevents the departure of coke particles being formed at the same time as the cracking effluents. These structured packing elements may cover all or part of the cross section of said stripping zone and over at least a portion of the height thereof, possibly in a staged manner, at least upstream and optionally downstream of the injection of at least one coking fraction.

According to a first variant of the present invention, the stripping step will comprise at least two zones comprising at least a first recycle coking zone occupied by at least a first structured packing element located upstream of the dispersing of the recycle of coking fraction and at least a second stripping zone occupied by at least a second structured packing element located downstream of the inlet of said recycle but upstream of the dispersing of the stripping fluids needed for discharging the cracking effluents. In each of the zones, it is possible to have a superposition of packing elements as a function of the desired homogeneity of the catalyst. It would not be outside the scope of the present invention if the coking fraction was recycled to at least two zones, these two zones being equipped with two superpositions of different structured packing elements, each of these zones comprising devices for dispersing the coking fraction downstream of the stream of catalyst particles, these zones always being followed by a third stripping zone corresponding to a third superposition of packing elements associated with a device for dispersing the stripping fluid.

In the context of the invention, according to a second variant, the coking fraction recycle zones may be separated by stripping zones, for example one or more recycle zone(s) then a stripping zone. In this sequence of recycle and stripping zones, the last zone is always a stripping zone.

By using structured packing elements it is possible to provide a continuous catalyst stream of homogeneous density. In a preferred embodiment, these packings occupy less than 10% of the area of the flow cross section in the vessel in which they are placed, although in projection on said section they occupy the entire area thereof.

The expression "stripping fluid" is understood to mean any compound not hydrocarbonaceous that is in the gas state at the time it is injected into the stripper, chosen from inert gases and steam. They ensure the aeration of catalyst particles but also make it possible to eliminate hydrocarbons trapped in the bed and/or the particles, which has the effect of increasing the catalytic activity of these particles.

In one preferred embodiment of the invention, a pre-stripping zone occupied by at least one structured packing element associated with a device for dispersing at least one stripping fluid downstream of the stream of particles is positioned upstream of the first recycle zone. The addition of this pre-stripping zone thus helps to restore a considerable portion of its catalytic activity to the catalyst and therefore of its coking capacity in the stripper.

Another subject of the present invention is a plant for implementing the invention, comprising the various vessels needed to implement a catalytic cracking process, that is to say at least a main reactor and possibly at least a secondary reactor, at least a disengager and a stripper and a single-stage or multistage regenerator, said plant including, in the stripper part, at the dense catalyst bed, at least one zone equipped with at least one structured packing element positioned upstream of the device for dispersing the coking fraction relative to the circulation of the stream of catalyst particles and these packing elements being formed by interlacing plates, strips or fins constituting a screen, this screen occupying less than 10% of the area of the flow cross section of the vessel in which it is placed but, in projection on said section, it may cover the entire area thereof.

Preferably, the stripper part of the plant will contain at least two zones equipped with structured packing elements associated with two fluid-dispersing devices, one for dispersing coking fractions, the other for dispersing the stripping fluid, these devices being located downstream of said packing elements relative to the stream of catalyst particles.

In one variant, several superpositions of packing elements, each associated with a device for dispersing a coking fraction, may come one after another with at least one packing element associated with a device for dispersing the stripping fluid in one and the same stripping step.

As packing elements, one or more of the structured packing elements described in the patents EP 719 850, U.S. Pat. No. 7,022,221, U.S. Pat. No. 7,077,997, WO 2007/094771, WO 00/35575 and CN 1 763 150 may be used. Here, in each of the envisaged packings, the stream of coked particles is aerated by making them follow preferential pathways obtained by interlacing plates, strips or fins constituting a screen. This screen may occupy less than 10% of the area of the flow cross section of the vessel in which it is placed but, in projection on said section, it may cover the entire area thereof. Such interlacing is generally arranged in layers of the same type, enabling this aerating of the particles to be controlled.

The devices for dispersing the recycle or stripping fluids may be chosen from spraying rod-type injectors, rings and sparger tubes.

For the injection of heavy fractions, it is preferred to use injectors for example of the venturi type, which, owing to a pressurized co-injection of a dispersing fluid, generally steam, make it possible to atomize the recycle fluid in order to thereby accelerate its vaporization immediately after it is injected.

In a first variant of said plant, the stripper may be located in the same vessel as the disengager.

In a second variant, the stripper may be located in a different vessel to the disengager, located downstream of the latter, but still positioned upstream of the regenerator. In one preferred form of the plant, the disengager and/or the stripper will advantageously comprise, at the outlet and/or inlet of the catalyst particles, at least one structured packing element followed by a device for dispersing the stripping fluids for the pre-stripping of the catalyst particles. Moreover, the stripping vessel will comprise means for discharging the cracking effluents essentially resulting from the recycle of the coking fractions to the coked catalyst in said vessel.

When the stripper comprises a plurality of packings for the intercalated recycle and stripping, each comprising devices for dispersing recycle fluids and stripping fluids, the volumes occupied for the recycle and the stripping are respectively from 25 to 65% and from 35 to 75% of the volume of the zone or vessel corresponding to the stripping step.

DETAILED DESCRIPTION OF THE INVENTION

The invention will now be described with reference to the appended non-limiting drawings in which.

Figure 1:
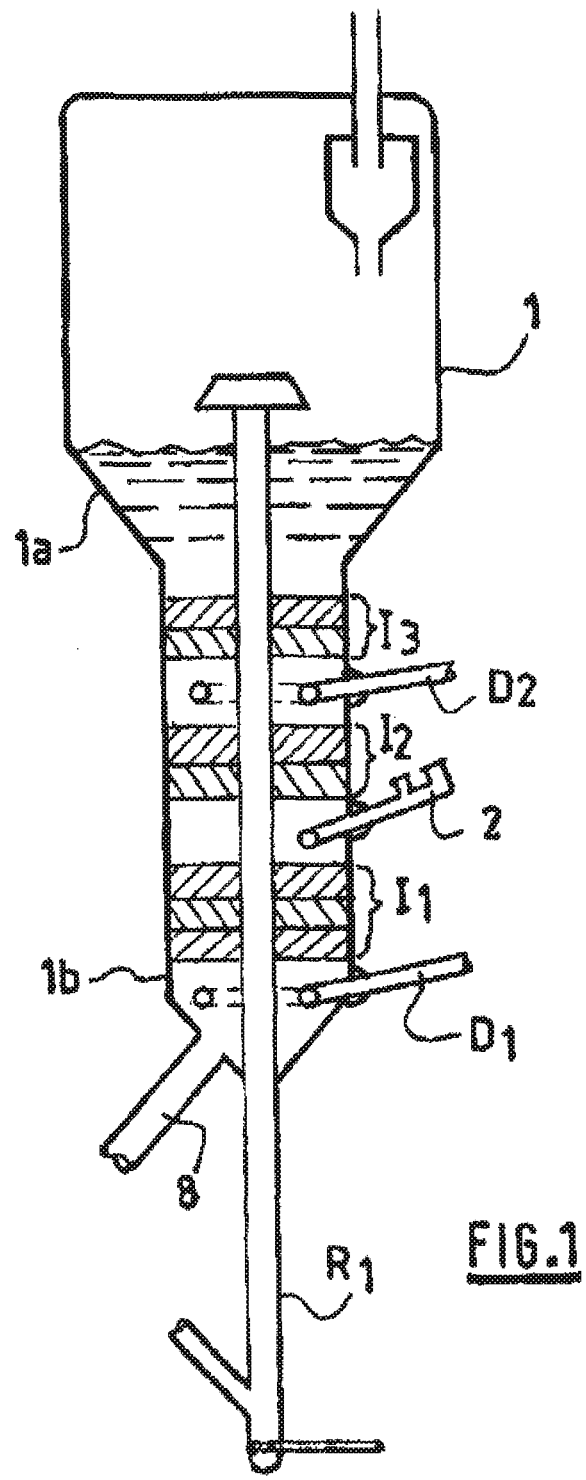
FIG. 1 is a section through a disengager-stripper in a single vessel.

FIG. 1 represents one embodiment of the reactor/stripper part of the plant for implementing the invention: it comprises a riser reactor (R1) equipped at its upper end with the single disengager/stripper (1) comprising the disengager part (1a) and the stripper part (1b) in the same vessel. This stripper part is equipped with three packings composed of several structured elements ($I_1$, $I_2$ and $I_3$). The stream of catalyst particles circulating from top to bottom, downstream of each packing have either steam dispersion rings ($D_1$ and $D_2$) for stripping the catalyst particles or a hydrocarbonaceous compound recycle injector (2). The pipe (8) connects the disengager/stripper (1) to a regenerator (not shown).

Figure 2:
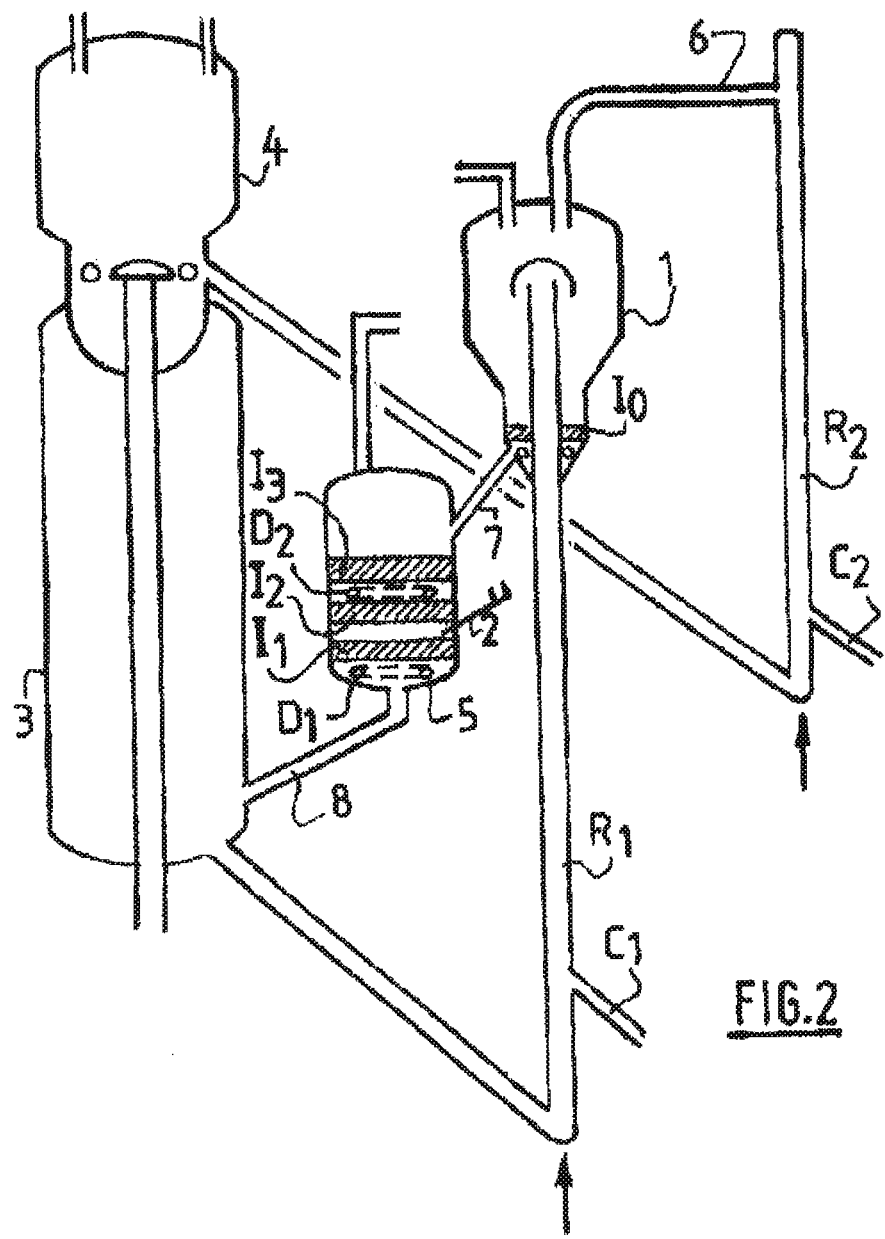
FIG. 2 is a diagram representing a catalytic cracking unit with two cracking reactors, a primary reactor and a secondary reactor, for which the stripping vessel is independent of the vessel for disengaging the coked catalyst/cracking effluents mixture.

FIG. 2 represents the whole of an FCC unit implementing the process of the invention according to one particular mode. The unit as represented comprises two reactors ($R_1$, main reactor, and $R_2$) both fed with a feedstock ($C_1$, $C_2$, $C_1$ being a feedstock according to the present invention). The effluents and the catalysts coked by the feedstocks in the two riser reactors are brought together in one and the same disengager (1). The unit also comprises a separate and independent stripper (5), connected to the disengager (1) via the pipe (7), and to the two-stage regenerator (3 and 4) via the pipe (8). The stripper (5) is equipped with three packings composed of several structured elements ($I_1$, $I_2$ and $I_3$). Within the stripper (5), with the stream of catalyst particles circulating from top to bottom, downstream of each packing either steam dispersion rings for stripping the catalyst particles ($D_1$ and $D_2$) or a hydrocarbonaceous compound recycle injector (2) are introduced.

Figure 3:
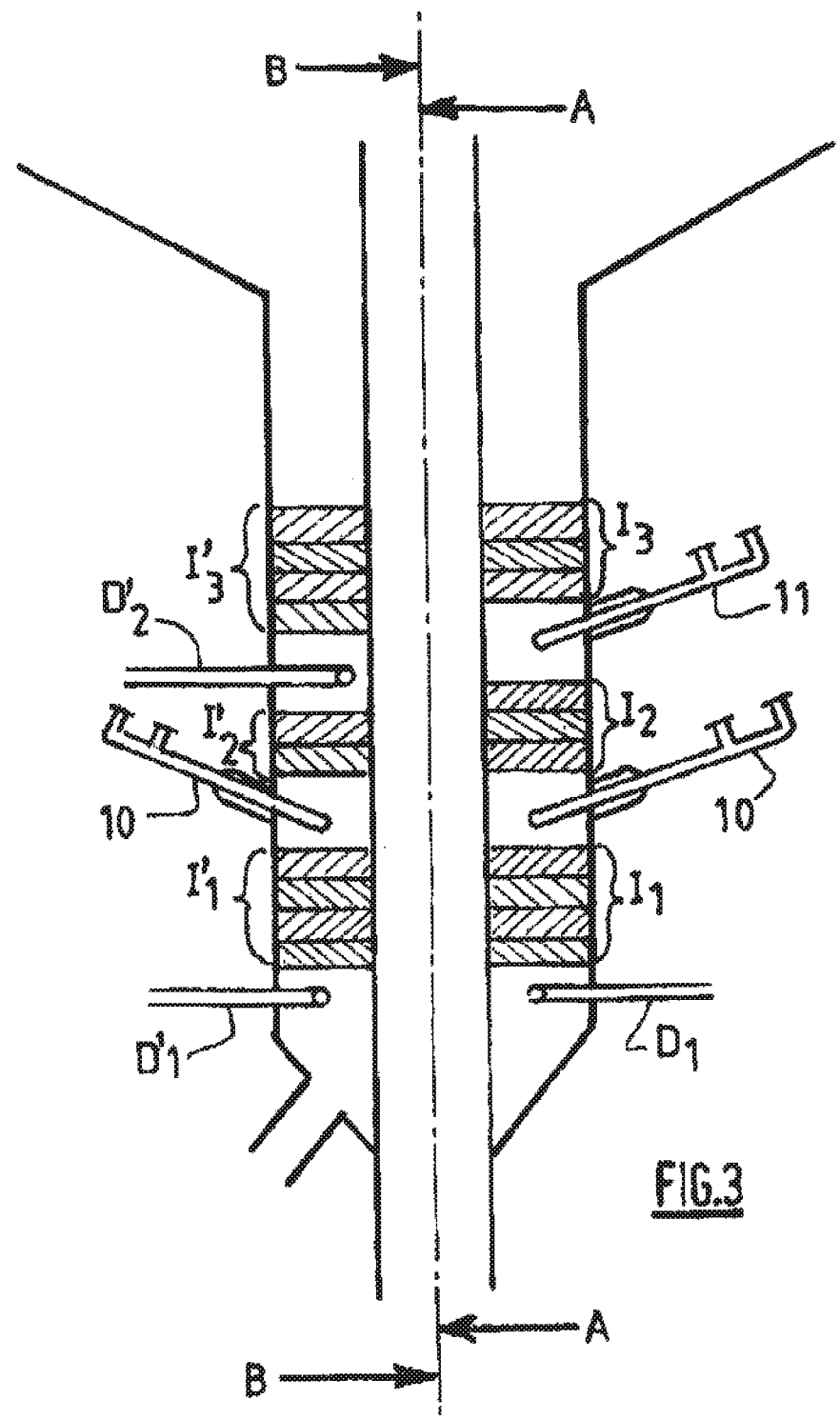
FIG. 3 represents, in cross section, two methods of filling stripping vessels with structured packings, each associated with a dispersion device downstream.

FIG. 3 represents, according to sections A-A and B-B, two methods of filling the stripper with packings composed of a non-identical number of structured elements. In these two sections, the stream of catalyst particles circulates from top to bottom. According to the section A-A, two successive packings ($I_2$) and ($I_3$) with injection of a recycle of hydrocarbons (10) and (11) via an injector, and a packing $I_1$ for stripping the particles by steam dispersion via the dispersion ring $D_1$. According to the section B-B, the stripper is equipped with three packings composed of several structured elements, two stripping steps corresponding to packings ($I'_2$) and ($I'_3$) and to the dispersion rings ($D'_1$) and ($D'_2$) frame a coking step comprising the recycle of hydrocarbon via the injector (10) and the packing ($I'_2$).

The examples, like the figures described above, aim to describe the invention without limiting the scope thereof.

EXAMPLE 1

The present example shows the advantages of the present invention by comparing the efficiency in terms of product yield when weakly coking feedstocks are cracked in an FCC unit with or without recycle of coking fractions.

A base case may be distinguished in which there is no recycle with a fluid catalytic cracking (FCC) unit having a single riser reactor with a capacity of 40 000 barrels per day, i.e. 240 tonnes per hour, and treating a corresponding hydrotreated VGO feedstock.

The main properties of the feedstock are given in Table 1 below.

TABLE 1

| Feedstock | | Hydrotreated VGO |
|---|---|---|
| Density | g/cm³ | 0.8610 |
| H$_2$ content | wt % | 13.5 |
| Sulphur content | ppm by weight | 330 |
| Nitrogen content | ppm by weight | 550 |
| CCR (Conradson | | <0.1 |

TABLE 1-continued

| Feedstock | | Hydrotreated VGO |
|---|---|---|
| carbon residue) | | |
| Ni content | ppm by weight | <2 |
| V content | ppm by weight | <2 |

This unit with no recycle of "coking" fraction into the stripper is carried out under the conditions presented in Table 2.

TABLE 2

| C/O | 8.6 |
|---|---|
| Riser outlet temperature, ° C. | 525 |
| delta coke wt % | 0.60 |
| Regenerator temperature, ° C. | 671 |

The regeneration temperature is too low, which may cause afterburning or post-combustion reactions of the coke which is only incompletely burnt off. Indeed, additional combustions may take place in the dilute phase of the bed fluidized in the regenerator, by combustion of the entrained particulate coke following the incomplete combustion in the dense phase thereof. In order to obtain a complete combustion, the optimal regeneration temperature required to prevent such phenomena is generally equal to or greater than 690° C.

The associated yield structure, that is to say the amounts of products obtained by cracking the feedstock, is provided in Table 3.

TABLE 3

| Yield relative to the feedstock | wt % |
|---|---|
| Dry gases | 1.98 |
| LPG C3/C4 | 22.81 |
| Petrol C5-220° C. | 56.50 |
| LCO (220-360° C.) | 9.53 |
| >360 ° C. | 3.98 |
| Coke | 5.22 |

In the second case, a "slurry" fraction resulting from the unit itself is recycled, as described in FIG. 1, to the dense phase of the stripper (1b), via 4 dispersion devices (2) positioned equidistantly downstream of a first packing ($I_2$) comprising several structured elements that make it possible to homogenize the stream of descending catalyst particles and to obtain good contact between the latter and the recycled slurry, and thus a thoroughly homogeneous deposit of additional coke on the catalyst. The positioning of the dispersion devices in the stripper downstream of the packing with which they are associated is chosen so that the overall contact time between the slurry and the catalyst particles is 70 seconds for a descent rate of the catalyst particles of 65 kg/m²/s.

A second packing ($I_3$) is located in the lower part of the dense phase of the stripper (1a) associated with a device for dispersing a stripping fluid ($D_1$), here, steam: the dispersion of steam makes it possible to strip the light products loaded with hydrogen atoms resulting from the cracking of the coking fraction. These light hydrocarbons will be recovered and mixed with the effluents from the reactor ($R_1$) in order to then be distilled and finally upgraded in the refinery. In this way, the coke ($Q_r$) resulting from the coking of the polycondensed or polyaromatic heavy hydrocarbons that are not very rich in hydrogen, is added to the coke ($Q_t$) resulting from the cracking of the feedstock in the reactor ($R_1$) in order to constitute the amount of coke (Qt) needed for the heat balance of the unit, before being sent to the regenerator. As this additional coke is free of an excess of hydrogen due to the stripping after the cracking reaction, the risks of hot spots appearing that are damaging to the catalyst, linked to the combustion of the hydrogen and also an excessive production of steam in the regenerator, will be avoided.

A third packing ($I_1$) associated with a device for dispersing stripping fluid ($D_2$), mainly steam, is positioned upstream of the first packing ($I_2$) in the dense phase of the stripper (1a) in order to carry out a pre-stripping of the catalyst particles before they encounter said coking fraction and thus help to restore a considerable portion of the catalytic activity and therefore of the coking power of said catalyst particles. The positioning of the devices for dispersing steam corresponds to that of the devices for dispersing the coking fraction: the targeted overall contact time between the stripping fluid and the catalyst particles is 70 seconds for a descent rate of the catalyst particles of 65 kg/m²/s.

Collated in Table 4 below are the yields obtained for the recycling of a slurry to a dense phase of catalyst particles in the stripper when there is:

State 1; neither prior stripping (or pre-stripping $I_3+D_2$), nor packing upstream of the recycle, but a terminal stripping ($I_1+D_1$)

State 2; no pre-stripping ($I_3+D_2$), a packing ($I_2$) upstream of the dispersion device (2) for the recycle of slurry and finally a terminal stripping ($I_1+D_1$).

State 3; a pre-stripping ($I_3+D_2$), followed by the recycle of slurry ($I_2+2$) and finally a terminal stripping ($I_1+D_1$).

TABLE 4

| Yield relative to the feedstock | State 1 | State 2 | State 3 |
|---|---|---|---|
| Dry gases (wt %) | 1.94 | 2.32 | 2.44 |
| LPG C3/C4 (wt %) | 2.44 | 3.18 | 3.66 |
| Petrol C5-220 ° C. (wt %) | 11.87 | 13.89 | 14.93 |
| LCO (220-360° C.) (wt %) | 29.00 | 28.62 | 28.09 |
| Slurry >360° C. (wt %) | 39.54 | 33.13 | 31.40 |
| Coke (wt %) | 15.09 | 18.86 | 19.81 |

In this table it is observed that the introduction of a packing comprising structured elements upstream of the recycle of slurry makes it possible to increase the amount of coke that will be deposited on the catalyst, and that the addition of a step of pre-stripping the catalyst before bringing it into contact with the coking fraction makes it possible to still further increase the cracking and the coking effect of this fraction.

In order to illustrate the contribution of the invention, Table 5 shows, for the unit in question, the gains as regards the amount of coke deposited on the catalyst ($Q_t$), or else delta coke, and also the corresponding increase in the temperature of the dense phase in the regenerator for a throughput of the coking fraction recycled to the stripper of 6 t/h.

TABLE 5

| | State 1 | State 2 | State 3 |
|---|---|---|---|
| Regenerator temperature (° C.) | 680 | 686 | 691 |
| Delta coke (wt %) | 0.63 | 0.66 | 0.68 |
| C/O (weight/weight) | 8.2 | 7.9 | 7.7 |

Thus, depending on the configuration envisaged for the recycle of the coking fraction to the stripper and therefore on the resulting amount of coke (see Table 4) deposited on the catalyst, the temperature within the regenerator increases from 671° C. for the configuration with no recycle to 691° C. for the "State 3" configuration and thus limits the afterburning phenomena linked to temperatures of the dense phase that are too low, typically below 690° C.

EXAMPLE 2

The present example shows the advantage of the present invention for making it possible to equilibrate the heat balance of a catalytic cracking unit with a deficit of coke in the regenerator operating in combustion mode by cracking of a weakly coking feedstock.

In this example, the catalytic cracking unit has a capacity of 340 t/h and treats a highly paraffinic feedstock originating from a hydrocracker. This feedstock has a density of 0.86, a Conradson carbon residue, determined by the ASTM D 482 standard, of less than 0.1% by weight and a content of metals (nickel+vanadium) of less than 0.1 ppm.

In Table 6 below, the first column collates the characteristics of this unit treating said feedstock with no recycle of heavy hydrocarbons into the stripper. By calculating the heat balance of the unit, a very small amount of coke on the catalyst, of 0.4% by weight, is obtained, which results in a very low temperature for the dense phase of the fluidized bed in the regenerator, barely above 640° C. Increasing the injection of air beyond the amount mentioned does not make it possible to increase this temperature beyond this threshold.

To raise the temperature of the catalyst, a heavy hydrocarbon, in this case slurry (350+), the density of which is 1.083 and the Conradson carbon residue of which is greater than 10% by weight, originating from the bottom of the primary fractionating column of the catalytic cracking unit is recycled. This recycling consists in injecting said heavy hydrocarbon into the stripper at the inserts dividing the grains of catalyst coked by the feedstock. The results of the heat balance are given in the second column of Table 6.

It is observed that by recycling 20 t/h of slurry to the stripper, the amount of coke deposited on the catalyst via cracking increases significantly, which then makes it possible to obtain a dense phase temperature which is perfectly satisfactory for ensuring the combustion of the coke on the catalyst via injection of a reasonable amount of air.

It is observed in this case that the hydrogen content of the coke increases slightly due to the adsorption of heavy molecules on the catalyst in the stripper, the H/C (hydrogen/carbon) molecular ratio of which is greater than that of the coke initially deposited on the catalyst following the cracking of the feedstock in the reactor. This increase of hydrogen in the coke is desired here because the combustion of this additional hydrogen helps to increase the temperature of the dense phase of the fluidized bed in the regenerator.

TABLE 6

|  |  | Without recycle | With Recycle |
|---|---|---|---|
| Feedstock throughput | t/h | 340 | 340 |
| Heavy HC recycle throughput | t/h | 0 | 20 |
| Preheat Temperature | ° C. | 250 | 250 |
| Reaction Temperature | ° C. | 518 | 518 |
| C/O | wt % | 9.5 | 6.8 |
| Delta coke (Qt) |  | 0.51 | 0.72 |
| H in coke | wt % | 6.94 | 7.35 |
| Dense Phase Temperature | ° C. | 642 | 694 |
| Injected air throughput | t/h | 229 | 247 |

From Table 6 it is observed that the amount of coke increases on the catalyst (Qt varying from 0.51 to 0.72) and that the excessively low temperature of the unit with no recycle is increased to more than 690° C., this ensuring the re-equilibration of the heat balance of the unit.

The invention claimed is:

1. Plant for implementing a process for fluidized bed catalytic cracking, comprising at least a main reactor and optionally at least a secondary reactor, at least a disengager and a stripper, and a single-stage or multistage regenerator, characterized in that the stripper contains, level with a dense catalyst bed, at least one zone equipped with at least one structured packing element positioned upstream of a device for dispersing a coking fraction with respect to circulation of a stream of catalyst particles, wherein said structured packing element(s) are formed by interlacing plates, strips or fins constituting a screen, said screen occupying less than 10% of the area of flow cross section in a vessel in which it is placed, but covering, in projection on said section, the entire area thereof.

2. Plant according to claim 1, characterized in that the stripper contains at least two zones equipped with at least one structured packing element that are associated with two fluid-dispersing devices, one for dispersing coking fractions, the other for dispersing the stripping fluid, these devices being located downstream of said structured packing elements relative to the stream of catalyst particles.

3. Plant according to claim 2, characterized in that the coking fractions and stripping fluid dispersion devices are chosen from spraying, rod-type injectors, venturi pressurized atomizing injectors, fluidization rings and sparger tubes.

4. Plant according to claim 1, characterized in that the stripper is located in one and the same vessel as the disengager.

5. Plant according to claim 1, characterized in that the stripper is located in a different vessel downstream of the disengager, but still positioned upstream of the regenerator.

6. Plant according to claim 5, characterized in that the disengager and/or the stripper comprises, respectively, at the outlet of said disengager and/or inlet of the catalyst particles into said stripper, at least one structured packing element followed by a device for dispersing stripping fluids for the pre-stripping of the catalyst particles.

7. Plant according to claim 1, characterized in that when the stripper comprises a plurality of structured packing elements for the intercalated recycle and stripping, each structured packing element being associated with a fluid-dispersing device, the volumes occupied for the recycle and the stripping are respectively from 25 to 65% and from 35 to 75% of the volume of stripping zone or vessel.

* * * * *